(12) United States Patent
Scholtes

(10) Patent No.: US 8,511,343 B2
(45) Date of Patent: Aug. 20, 2013

(54) BLADDERLESS RESERVOIR TANK FOR A HYDRAULIC ACCUMULATOR

(75) Inventor: Nicholas J. Scholtes, Shorewood, IL (US)

(73) Assignee: Control Solutions LLC, Aurora, IL (US)

( * ) Notice: Subject to any disclaimer, the term of this patent is extended or adjusted under 35 U.S.C. 154(b) by 187 days.

(21) Appl. No.: 12/851,163

(22) Filed: Aug. 5, 2010

(65) Prior Publication Data

US 2012/0031900 A1 Feb. 9, 2012

(51) Int. Cl.
*F17D 1/08* (2006.01)

(52) U.S. Cl.
USPC ........... 137/590; 137/592; 137/558; 137/376; 60/413; 60/585; 60/592

(58) Field of Classification Search
USPC ................. 137/590, 592, 558, 376; 60/413, 60/592, 585
See application file for complete search history.

(56) References Cited

U.S. PATENT DOCUMENTS

| | | | |
|---|---|---|---|
| 611,910 A | 10/1898 | Hulme | |
| 684,767 A | 10/1901 | Duryea | |
| 1,470,775 A | 10/1923 | Stephens | |
| 2,210,118 A | 8/1940 | Duncan | |
| 2,859,892 A * | 11/1958 | Daley | 220/581 |
| 3,682,197 A | 8/1972 | Snyder | |
| 3,993,094 A * | 11/1976 | Spooner | 137/588 |
| 4,026,110 A * | 5/1977 | Engstrom | 60/592 |
| 4,179,036 A | 12/1979 | Pasini | |
| 4,185,750 A * | 1/1980 | Op den Camp | 220/501 |
| 4,210,176 A * | 7/1980 | Emming | 137/573 |
| 4,424,829 A | 1/1984 | Millington et al. | |
| 4,441,520 A * | 4/1984 | Bruso et al. | 137/44 |
| 4,488,404 A | 12/1984 | Arakawa et al. | |
| 4,805,668 A * | 2/1989 | Genter et al. | 137/558 |
| 4,915,130 A * | 4/1990 | Dowler | 137/579 |
| 5,097,867 A * | 3/1992 | Frigiere et al. | 137/590 |
| 5,102,400 A * | 4/1992 | Leibinsohn | 604/251 |
| 5,176,174 A | 1/1993 | Toraason et al. | |
| 5,186,324 A | 2/1993 | Brandon, Jr. | |
| 5,285,923 A | 2/1994 | Brandon, Jr. | |
| 5,918,760 A * | 7/1999 | Frodin et al. | 220/661 |
| 6,105,611 A * | 8/2000 | Ando et al. | 137/558 |
| 6,286,545 B1 * | 9/2001 | Moy et al. | 137/574 |
| 6,371,158 B1 | 4/2002 | Hou et al. | |
| 6,913,040 B2 * | 7/2005 | Crossman et al. | 137/587 |
| 7,261,123 B2 * | 8/2007 | Kim | 137/550 |
| 7,383,795 B2 | 6/2008 | Lawrence et al. | |
| 7,429,322 B2 | 9/2008 | Fujita et al. | |
| 7,600,376 B2 * | 10/2009 | Hall et al. | 60/413 |
| 7,644,727 B2 * | 1/2010 | Dudra et al. | 137/565.17 |
| 7,654,377 B2 * | 2/2010 | Burkhart et al. | 192/12 D |
| 8,038,878 B2 * | 10/2011 | Hewkin | 210/167.32 |
| 8,197,012 B2 * | 6/2012 | L'Aot et al. | 303/1 |
| 2006/0016484 A1 * | 1/2006 | Hayashi | 137/558 |
| 2008/0302805 A1 | 12/2008 | Komorida et al. | |

* cited by examiner

*Primary Examiner* — John Rivell
*Assistant Examiner* — Minh Le
(74) *Attorney, Agent, or Firm* — McCracken & Frank LLC

(57) ABSTRACT

A bladderless reservoir tank is provided with a hollow body that forms a cavity for receipt of a working fluid. A pick-up tube is attached to the hollow body of the reservoir tank. A portion of the pick-up tube extends into the interior of the body such that a port of the pick-up tube is positioned at the centroid of the hollow body. The pick-up tube has a channel that extends from the port at the centroid to the exterior of the body of the reservoir tank.

10 Claims, 6 Drawing Sheets

BLADDERLESS RESERVOIR TANK FOR A HYDRAULIC ACCUMULATOR

FIELD OF THE INVENTION

This invention relates to reservoir tanks for hydraulic accumulator tanks and in particular to reservoir tanks having a fluid pipe extending into the interior of the tank to drain a working fluid.

BACKGROUND

In current hydraulic systems, volumetric changes are common resulting from moving parts in the system and temperature changes in the hydraulic fluid. To account for these volumetric changes, current hydraulic systems include a reservoir tank to contain the overflow that occurs as a result of changes in the volume of the fluid.

In any hydraulic system, it is important to prevent the ingestion of air into the system. The entrapment or dissolving of gas into the hydraulic fluid can be problematic. Hydraulic fluid is useful in hydraulic systems because of its incompressible nature. Because gas is compressible, if it becomes entrapped by or dissolved into the hydraulic fluid, the gas can affect the fluid's incompressible nature. If gas comes out of the hydraulic fluid, the hydraulic system may experience pressure drops, cavitation, a loss of functionality, or general harm. As a result, hydraulic systems need to ensure that an inlet or pick-up port of a pick-up tube at the reservoir tank is not exposed to the atmosphere, which would risk the ingestion of air into the system. Hydraulic systems attempt to accomplish this by ensuring this inlet or pick-up port of the reservoir tank is constantly submerged by hydraulic fluid. The pick-up tube may be a tube, pipe, or other elongate body with a hollow portion that allows working fluid to flow into and out of the reservoir tank. The pick-up port may act as an inlet to the pick-up tube to drain working fluid through the pick-up tube.

Certain conventional stationary systems may feature reservoir tanks that allow hydraulic fluid to enter from the top of the tank and exit from the bottom of the tank. Because the reservoir tank does not move, as long as the fluid port is covered by hydraulic fluid, there is little risk of exposing the port to the atmosphere. One may refill the reservoir tank by opening the fill port on top of tank to add more hydraulic fluid. The stationary nature of the reservoir tank allows the tank to be vented to the atmosphere, and no special precautions are necessary when opening the fill port.

However, where the hydraulic system is not stationary, additional precautions may be necessary. In a hydraulic system where the tilting or rotation of the reservoir tank is possible, the shifting hydraulic fluid may expose the pick-up port to the atmosphere.

Current approaches that address this issue involve additional structures and processes in an effort to allow the reservoir tank to tolerate movement. These approaches include pressurized systems and bladder-type systems. Pressurized systems may require specialized tools and equipment to depressurize and re-pressurize the system during repair and maintenance resulting in increased cost, duration, and complexity.

Thus, there is a need for a reservoir tank, tolerant of movement, which does not require pressurization or the use of additional, complex structures that is also easy and inexpensive to manufacture, maintain, and repair.

SUMMARY

A bladderless reservoir tank is provided with a hollow body that forms a cavity for receipt of a working fluid. A pick-up tube is attached to the hollow body of the reservoir tank. A portion of the pick-up tube extends into the interior of the body such that a port of the pick-up tube is positioned at the centroid of the hollow body. The pick-up tube has a channel that extends from the port at the centroid to the exterior of the body of the reservoir tank.

DETAILED DESCRIPTION

A low-cost, bladderless hydraulic reservoir tank is described herein. The reservoir tank described, for example, may be used in systems that do not consume the working fluid, such as a hydraulic system.

The reservoir tank described may be used without additional complex mechanical structures such as bladders, pistons, and springs or further pressurization of the tank. The reservoir tank includes a pick-up tube having a pick-up port specifically positioned and extending to the centroid of the tank body. The tank is filled with a sufficient amount of working fluid such that the pick-up port of the pick-up tube is continuously submerged regardless of the position or orientation of the tank. In one embodiment, the reservoir tank may include a fill cap that allows access to the interior of the tank. Other embodiments may also include a fill level indicator used to determine how much working fluid should be placed in the tank and how much fluid is currently in the tank. The fill level indicator may be, for example, a dipstick as it is known in the art. However, any device for measuring the level of fluid in the tank may be employed.

The reservoir tank described herein may vary in size, shape, and fluid level based on the design constraints of the system in which it is used. The reservoir tank includes a hollow body with an interior chamber, a pick-up tube extending into the chamber of the tank, and an attachment assembly allowing the reservoir tank to be mounted onto a system. One embodiment of the reservoir tank may include a detachable fill cap allowing access to the interior of the shell of the reservoir tank. Another embodiment may also include a fill level indicator that indicates current fluid levels.

Figure 1A:
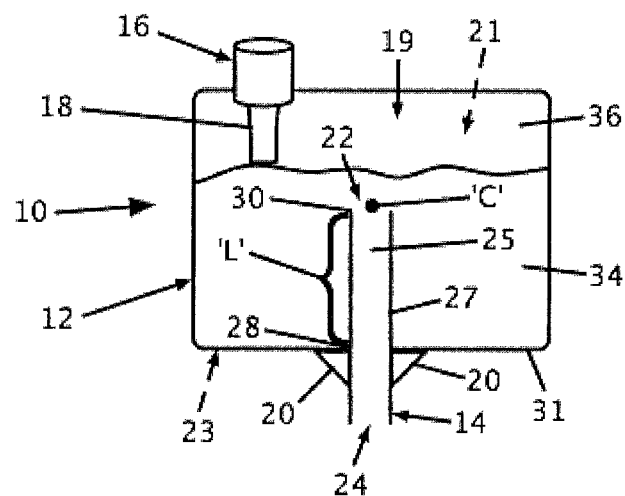
FIG. 1A is a front view of an example rectangular-shaped, bladderless reservoir tank in a vertical position in which the reservoir tank contains working fluid that submerges a pick-up port of a pick-up tube.

Referring to FIG. 1A, an example reservoir tank 10 is shown. reservoir tank 10, in this example, includes hollow body 12, pick-up tube 14, fill cap 16, dipstick 18, and attachment assembly 20. Body 12 of reservoir tank 10 forms hollow cavity 19 within body 12 having interior 21 and exterior 23 portions. Pick-up tube 14 includes a pick-up port 22 positioned in the interior 21 of body 12, an exit port 24 extending from the exterior 23 of body 12. Channel 25 of pick-up tube 14 extends from pick-up port 22 to exit port 24.

Pick-up tube 14 is also formed to have a portion 27 of the pipe extending into the interior 21 of body 12, the portion having a particular length 'L'. Portion 27 of pick-up tube 14 extends to the centroid 'C' of body 12. Length may be determined by the location of centroid 'C' such that pick-up port 22 is positioned at the centroid. Positioning pick-up port 22 at the centroid allows the tank to be filled with a sufficient amount of working fluid such that the pick-up port is continuously submerged by the working fluid regardless of the orientation of tank.

Figure 1B:
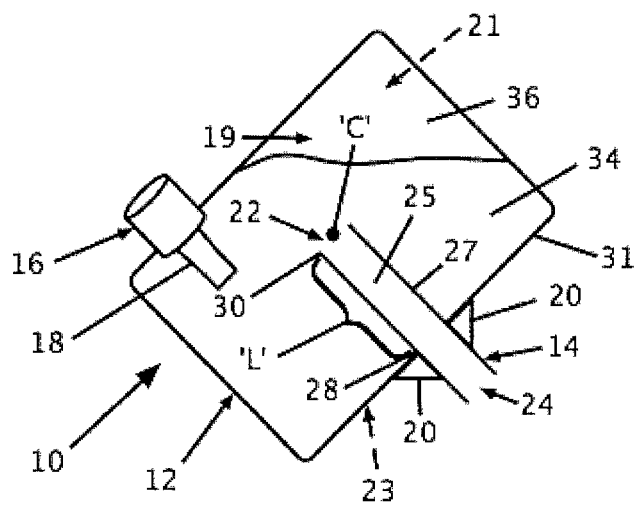
FIG. 1B is a front view of the rectangular-shaped reservoir tank of FIG. 1A in a tilted position.
Figure 1C:
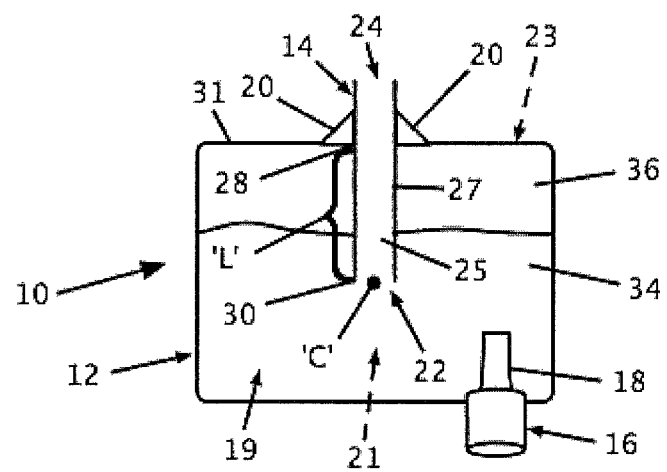
FIG. 1C is a front view of the rectangular-shaped reservoir tank of FIG. 1A in an inverted position.

As seen in FIG. 1A, example reservoir tank 10 includes a straight pick-up tube 14 with portion 27 of the tube extending into the interior 21 of body 12. In particular, the center of the pick-up port 22 is positioned at the centroid 'C' of the hollow body 12. The length 'L' of the straight pick-up tube 14, in this example, is equal to the distance from the wall 31 of the tank body 12 where pick-up tube 14 is positioned to the centroid 'C' in the interior portion 21 of the tank 10. As shown herein, positioning pick-up port 22 of pick-up tube 14 at the centroid 'C' allows a sufficient amount of working fluid 34 to continuously submerge pick-up port 22 regardless of the orientation of the reservoir tank 10 such as titled and inverted orientations as seen in FIGS. 1B and 1C respectively.

Body 12 of reservoir tank 10, in this particular example, is rectangular in shape with a hollow interior. The bodies of other embodiments may be shaped differently. Body 12 of reservoir tank 10 may be made from any materials suitable to manufacture reservoir tanks. For example, because there is no need to pressurize the tank, plastics may be used to construct the body 12 of accumulator tank 10. Further, transparent plastics may be used, which allow the fluid-level of the reservoir tank 10 to be seen and monitored.

Pick-up tube 14 is attached to body 12 of reservoir tank 10. Pick-up tube 14 may be made from the same material as body 12 or from another type of material rigid enough to withstand the hydraulic fluid. For example, stainless steel, brass, plastic, Teflon, and the like may used to construct pick-up tube 14. In one example embodiment, the pick-up tube may be formed from the same continuous structure as the body of the tank. In other embodiments, the pick-up tube may be manufactured separately and inserted into and attached to the body of the reservoir tank. Pick-up tube 14 has a pick-up port 22 that is positioned in the center of body 12 of reservoir tank 10. Pick-up tube also has an exit port 24 that allows working fluid to flow through channel 25 from the interior to the exterior of the reservoir tank. The pick-up tube 14 may be positioned at the centroid of the body of the tank. The centroid of the tank may be determined by any conventional method known to those skilled in the art.

Once the centroid is determined, the desired length for the pick-up tube may be calculated. Still referring to FIG. 1A, pick-up tube 14 of reservoir tank 10, in this example, is a straight pipe and has a particular length 26. Length 26 of pick-up tube 14 is defined by a first point 28 and a second point 30. First point 28 is positioned at the wall of body 12 of tank 10. Second point 30 is positioned at the center of body 12 of tank 10. As seen in FIG. 1A, pick-up tube 14, in this example, is attached perpendicular to wall 31 of body 12. Length 26 of pick-up tube 14 equals the distance between first point 28 to second point 30.

The reservoir tank may be installed in a system such as a hydraulic system. Users may then add a sufficient amount of working fluid to ensure the pick-up port of the pick-up tube is submerged by working fluid regardless of the position or orientation of the tank. Working fluid may be any fluid used in a system where the fluid is used to perform work and is not consumed by the system. An example of working fluid is hydraulic fluid used in a hydraulic system to move a piston in a hydraulic cylinder. An appropriate amount of working fluid may be determined based on the size of the system and type of working fluid used.

Also shown in FIG. 1A, fill cap 16 may be attached to body 12 of reservoir tank 10 providing users access to the interior of the body of the tank. Fill cap 16 may be made from any material traditionally used to seal reservoir tanks or other fluid containers. Additionally, fill cap 16 may be attached to body 12 of reservoir tank 10 in any feasible manner as understood by those skilled in the art. Further, the size, shape, and means of attachment of fill cap 16 may depend on the design constraints of the system.

Additionally, dipstick 18 may be used as a fill level indicator in this example. However, any other fill level indicator may be selectively employed to indicate the current level of fluid in the system. Based on the readings from dipstick 18, working fluid may be added or removed from the reservoir tank. In one embodiment, dipstick 18 may be attached to fill cap 16. Removing fill cap 16 allows a user to examine any markings on dipstick 18.

Further, to facilitate the attachment of the reservoir tank to a system, an embodiment may include an attachment assembly allowing users to mount the reservoir tank to that system. Still referring to FIG. 1A, attachment assembly 20 is used to mount reservoir tank 10 to the other components of the system. The design of attachment assembly 20 may depend on the design constraints of the system. As a result, attachment assembly 20 may be designed in any feasible manner as understood by those skilled in the art as a function of the design specifications of the system in which the reservoir tank is used.

Now referring to FIG. 1B and FIG. 1C, the example rectangular-shaped reservoir tank 10 of FIG. 1A is shown containing working fluid 34 in respective tilted and inverted positions. As shown in FIG. 1B and FIG. 1C, air 36 in the tank moves to the highest position of body 12 of tank 10. Working fluid 34 is provided in a sufficient amount such that pick-up port 22 of pick-up tube 14 is submerged in both a tilted and inverted position. A sufficient amount of working fluid ensures that the pick-up tube of the reservoir tank is continuously submerged regardless of the position or orientation of the tank.

Figure 1D:
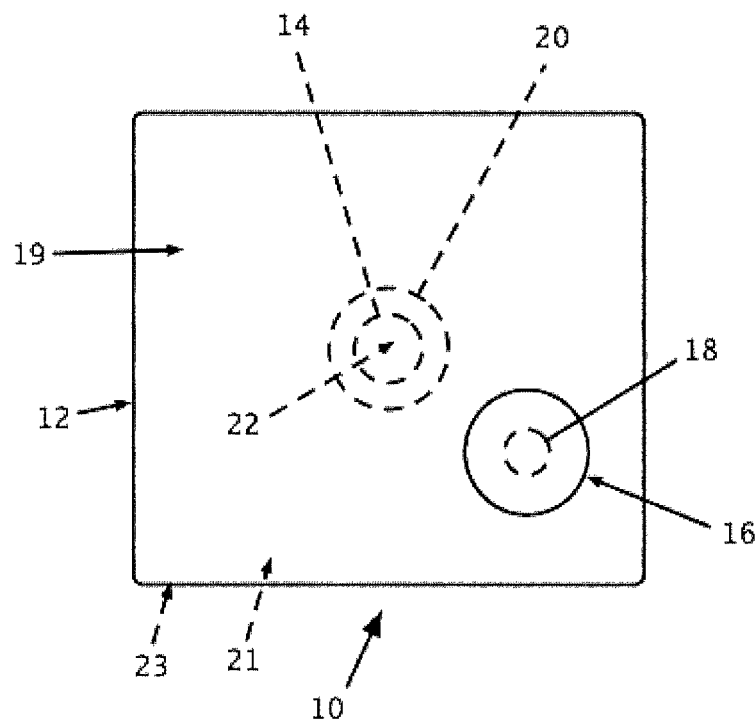
FIG. 1D is a top view of an example rectangular-shaped reservoir tank.

Referring now to FIG. 1D, a top view of a rectangular-shaped example reservoir tank 10 is shown. Fill cap 16 may be removed and dipstick 18 examined. If reservoir tank 10 has an appropriate level of working fluid, fill cap 16 may be reattached to reservoir tank 10. If dipstick 18 indicates that reservoir tank 10 has a level of working fluid below the appropriate level, additional working fluid may be added to reservoir tank 10 and fill cap 16 may be reattached. If dipstick 18 indicates that reservoir tank 10 has an excess of working fluid above the appropriate fill level, excess working fluid may be removed. Dipstick 18 may be used to assess the working fluid level as the fluid is removed to ensure the appropriate fill level is achieved. Once enough working fluid has been removed, fill cap 16 may be reattached to reservoir tank 10. Because volumetric changes in the working fluid are possible, the dipstick or other fill level indicator may be marked, for example, to show an appropriate fill level when the system is not operating and at room temperature. In another example, the dipstick may be marked to show an appropriate fill level while the system is in operation and at full operating temperature. Thus, the dipstick or other fill level indicator markings may allow the working fluid level to be evaluated, for example, when the system is not in operation after the working fluid has returned to room temperature, when the system is in operation with the working fluid at full operating temperature, or at any other desired time. It should be understood that alternative embodiments may exclude the fill cap, dipstick, or both.

Figure 1E:
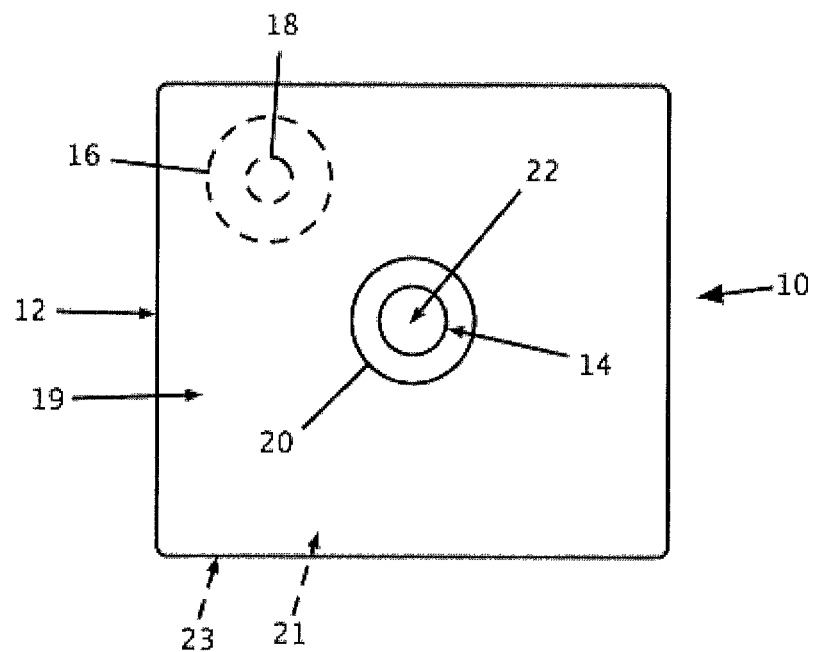
FIG. 1E is a bottom view of an example rectangular-shaped, reservoir tank.

As seen in FIG. 1E, a bottom view of a rectangular-shaped example reservoir tank 10 is shown. Attachment assembly 20 may be used to mount and secure reservoir tank 10 to other components in the system. The design of the attachment assembly will depend on the particular design constraints and requirements of the system in which the reservoir tank is used. Attachment assembly 20 may be of any feasible design known by those skilled in the art or any unique design created to meet the specific needs of a system. It should be understood that alternative embodiments may exclude an attachment assembly. Working fluid flows into and out of reservoir tank 10 through channel 25 of pick-up tube 14.

Regarding the appropriate amount of working fluid, an appropriate amount of working fluid refers to the volume of working fluid in the entire system. The volume of working fluid is a fluid volume sufficient to continuously submerge the pick-up port of the pick-up tube regardless of the position or orientation of reservoir tank. In the example reservoir tank seen in FIGS. 1A-1C, an appropriate amount of working fluid is determined based on the size and type of the system used. In view of the pick-up port being positioned at the centroid of the body of the reservoir tank, the appropriate amount of working fluid is a volume that fills at least half of the reservoir tank to ensure the pick-up port of the pick-up tube is continually submerged. For example, in a reservoir tank used in a hydraulic system, the appropriate amount of working fluid includes the following volumes: half the volume of the reservoir tank; the full volume of the hydraulic cylinder in the extended position; the full volume of the pump, the lines, and all other components in the system. Further, a small amount of extra fluid may be used in this example hydraulic system to ensure the pick-up port of the pick-up tube is continually submerged.

In some systems, the volume of the working fluid in the reservoir tank may vary as the system operates. These volumetric changes may result from the movement of system components such as cylinders and valves. As a result, the appropriate fill level may be determined by calculating the lowest point of the reservoir tank above the pick-up port of the pick-up tube and providing a sufficient amount of working fluid to ensure the pick-up port is always submerged.

Figure 2A:
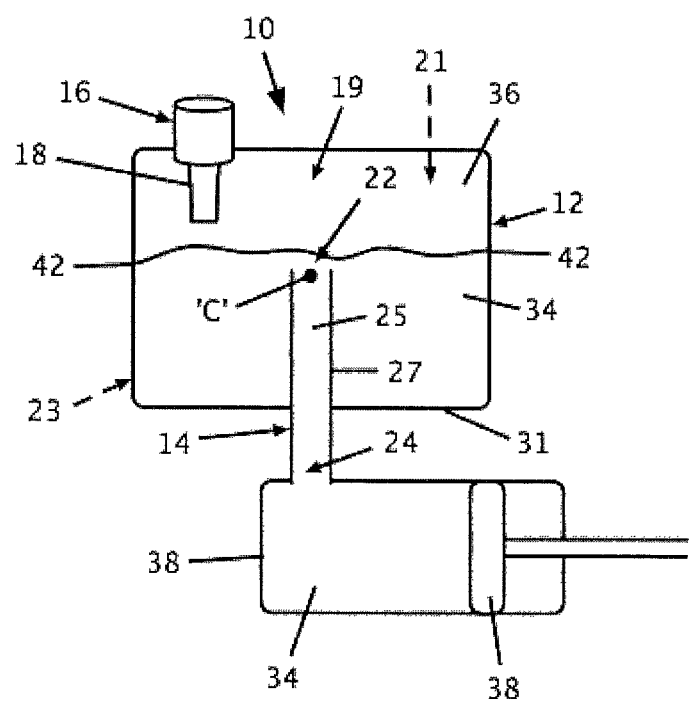
FIG. 2A is a front view of an example rectangular-shaped, bladderless reservoir tank attached to a hydraulic cylinder with the piston in an out-stroke position.
Figure 2B:
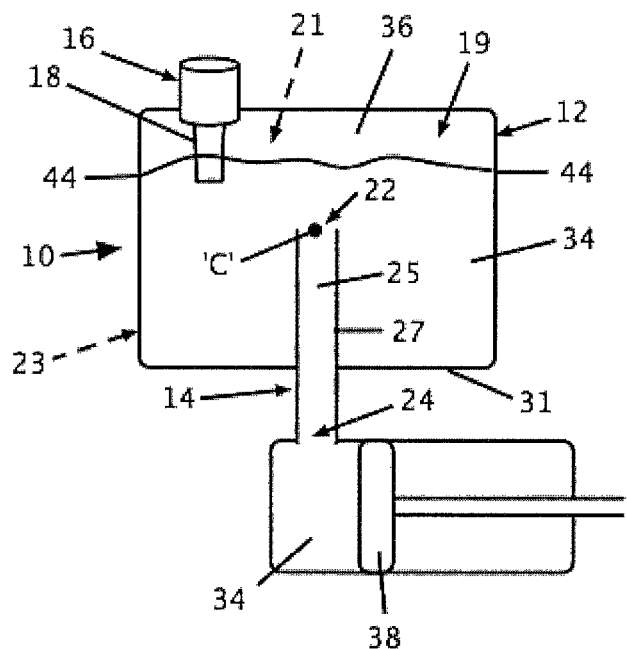
FIG. 2B is a front view of the reservoir tank and hydraulic cylinder of FIG. 2A with the piston in an in-stroke position.

Referring to FIG. 2A and FIG. 2B, an illustration of volumetric changes in an example hydraulic system is shown. Volumetric changes result from piston 38 moving in and out of hydraulic cylinder 40. As seen in FIG. 2A, when piston 38 moves out of hydraulic cylinder 40, working fluid 34 is drawn from reservoir tank 10 through pick-up tube 14, out exit port 24, and into the hydraulic cylinder. As working fluid 34 is drained from reservoir tank 10, the working fluid reaches a minimum point 42 in reservoir tank 10. As seen in FIG. 2B, when piston 38 moves into hydraulic cylinder 40, working fluid 34 is pushed from the hydraulic cylinder back through exit port 24 and pick-up tube 14 into reservoir tank 10. As working fluid 34 returns to reservoir tank 10, the working fluid reaches a maximum point 44. To ensure that the pick-up port 22 of the pick-up tube 14 is continuously submerged by working fluid 34, the appropriate fill volume of the working fluid at least includes that which fills reservoir tank 10 to minimum point 42. For example, to determine the minimum point in a reservoir tank used in a hydraulic system, the hydraulic cylinder is fully extended, and the system is filled until working fluid fully submerged the pick-up port of the pick-up tube. Thus, as the hydraulic cylinder retracts, the working fluid will be pushed to the maximum point in the reservoir tank.

In addition to volumetric changes, other considerations may also be taken into account when determining the appropriate fill level for a particular reservoir tank. Such considerations include the fluid-air ratio in the system and the thermal expansion properties of the type of working fluid used due to temperature extremes.

Figure 3A:
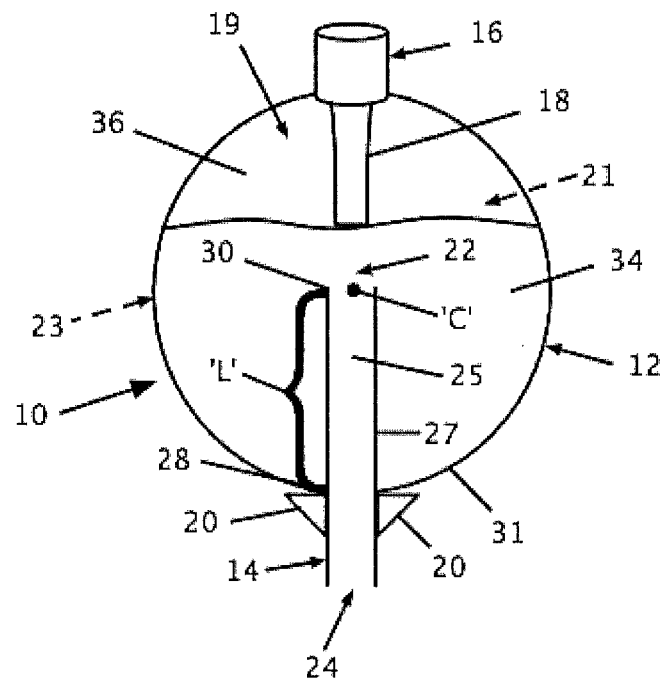
FIG. 3A is a front view of an example spherical-shaped, bladderless reservoir tank in a vertical position in which the reservoir tank contains working fluid that submerges a pick-up port of a pick-up tube.
Figure 3B:
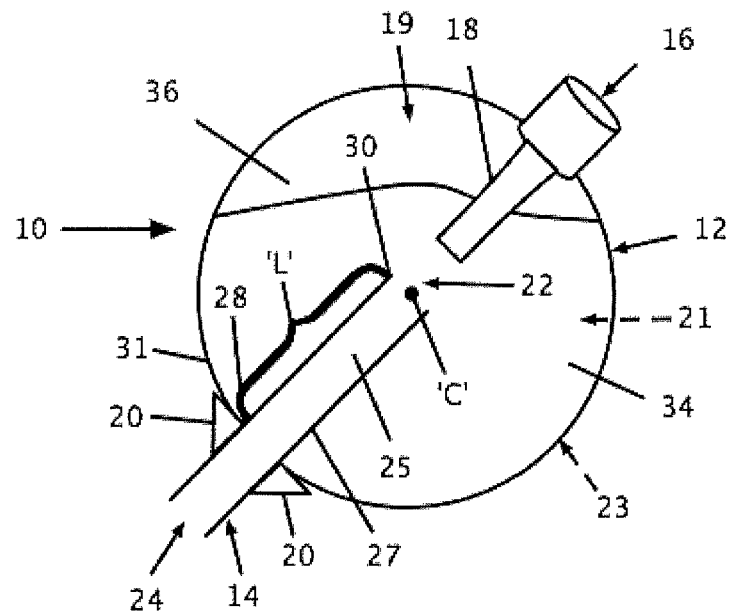
FIG. 3B is a front view of the spherical-shaped reservoir tank of FIG. 3A in a tilted position.
Figure 3C:
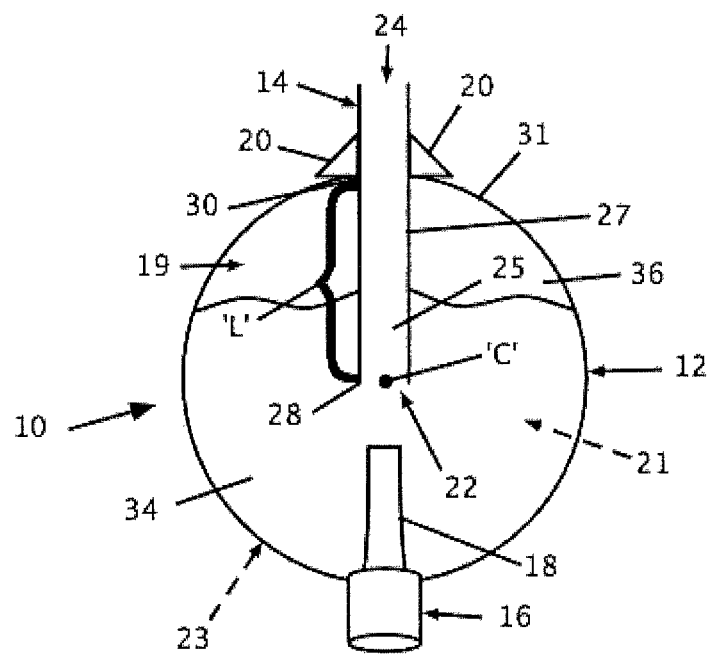
FIG. 3C is a front view of the spherical-shaped reservoir tank of FIG. 3A in an inverted position.

Now referring to FIGS. 3A-3C, other embodiments may feature bodies that are spherical in shape. The centroid of an example reservoir tank having a body that is spherical in shape may be determined by methods known to those skilled in the art. Like alternatively shaped embodiments, the same considerations of system type, volumetric changes, thermal expansion, and fluid-air ratios may be taken into account when calculating the appropriate fill level. FIG. 3A illustrates that the example reservoir tank 10 may use a sufficient amount of working fluid 34 to submerge pick-up port 22 of pick-up tube 14. FIG. 3B illustrates that a sufficient amount of working fluid 34 will keep pick-up port 22 submerged when reservoir tank 10 is in a tilted position. FIG. 3C illustrates this same effect when reservoir tank 10 is in an inverted position. Thus, the same effect of a continuously submerged pick-up port may be achieved with alternatively shaped bodies of reservoir tanks filled with a sufficient amount of working fluid.

Figure 4:
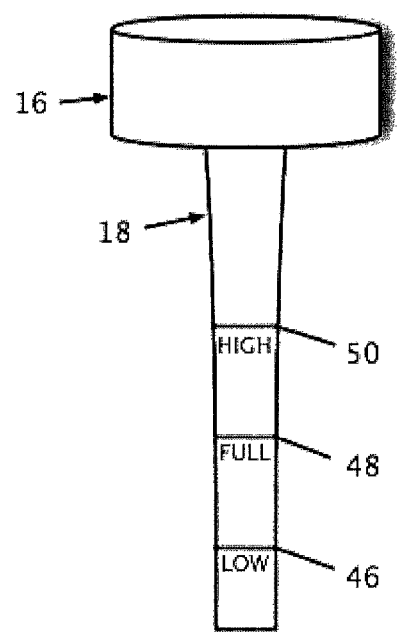
FIG. 4 is an example fill level indicator shown as a dipstick having fluid level markings and attached to an example fill port cap.

Now referring to FIG. 4, an example fill cap 16 with a dipstick 18 attached is shown. The dipstick may include one or more markings that indicate the level of fluid in the accumulator tank. Dipstick 18 includes a low-level marker 46, a full-level marker 48, or a high-level marker 50. Low-level marker 46 may indicate that the level of working fluid is below the appropriate fill level requiring the addition of more working fluid. Full-level marker 48 may indicate that the level of working fluid is at the appropriate fill level requiring no further action. High-level marker 50 may indicate that the level of working fluid is above the appropriate fill level requiring the removal of some working fluid.

The reservoir tank herein described improves upon existing systems in a number of ways. The reservoir tank is adapted to be used in any position while preventing air from being entrapped or dissolved into the hydraulic fluid. Additionally, the reservoir tank is less costly due to the wide variety of cheap materials that may be used to construct the body of the tank. Further, the reservoir tank is easier to manufacture than reservoir tanks that require pressurization and additional mechanical structures such as bladders. The elimination of these elements also reduces the weight of reservoir tanks and improves their volume-to-size ratio. As a result, smaller reservoir tanks may have larger fluid capacities than similarly sized tanks using mechanical components that partially fill the volume of the tanks. The reservoir tank does not need to be pressurized resulting in easier maintenance and repair. Thus, the reservoir tank may be opened under neutral pressure conditions without the need for pressurization equipment or specialized tools.

The invention illustratively disclosed herein suitably may be practiced in the absence of any element, part, step, component, or ingredient, which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A reservoir tank for a hydraulic system having a hydraulic cylinder and a piston within the hydraulic cylinder, comprising:
    a hollow body forming a cavity, the hollow body having an interior portion, an exterior portion, and a centroid located within the interior portion;
    a pick-up tube attached to the hollow body with a portion of the pick-up tube extending into the interior portion of the hollow body, the pick-up tube having a port positioned at the centroid in the interior portion of the hollow body, wherein the hollow body of the reservoir tank is adapted to be filled with a volume of working fluid such that the working fluid continuously submerges the port of the pick-up tube regardless of the orientation of the hollow body of the reservoir tank; and
    a channel of the pick-up tube extending from the port at the centroid of the hollow body to the exterior portion of the hollow body of the tank such that the working fluid flows through the channel from the interior portion to the exterior portion of the hollow body of the reservoir tank, and wherein the working fluid continuously submerges the port at levels that vary between a maximum point and a minimum point due to volumetric changes of the working fluid in the hollow body resulting from the piston moving in and out at the hydraulic cylinder.

2. The reservoir tank of claim 1 wherein the pick-up tube is a straight pipe positioned perpendicular to a wall of the hollow body of the reservoir tank.

3. The reservoir tank of claim 2 wherein the portion of the pick-up tube, extending into the interior portion of the hollow body, has a length extending from the centroid to the wall of the hollow body of the reservoir tank.

4. The reservoir tank of claim 3 wherein the pick-up tube has an exit port positioned outside the exterior portion of the hollow body of the reservoir tank.

5. The reservoir tank of claim 1 wherein the center of the port is positioned at the centroid of the hollow body of the reservoir tank.

6. The reservoir tank of claim 1 wherein the working fluid is hydraulic fluid.

7. The reservoir tank of claim 1 further comprising
    a fill cap detachably mounted to the hollow body of the reservoir tank providing access to the interior of the hollow body of the reservoir tank, and
    a fill level indicator attached to the fill cap such that the fill level indicator provides information pertaining to the amount of working fluid present in the reservoir tank.

8. The reservoir tank of claim 7 wherein the fill level indicator is a dipstick.

9. The reservoir tank of claim 1 wherein the hollow body of the reservoir tank is cuboid in shape.

10. The reservoir tank of claim 1 wherein the hollow body of the reservoir tank is spherical in shape.

* * * * *